(12) United States Patent
Jobard et al.

(10) Patent No.: US 7,982,418 B2
(45) Date of Patent: Jul. 19, 2011

(54) RHEOSTATIC SAFETY BRAKING DEVICE HAVING A BIPOLAR RESISTIVE ASSEMBLY WITH PERMANENT MAGNET MOTOR

(75) Inventors: Thierry Jobard, Lyons (FR); Eric Bonin, Jardin (FR)

(73) Assignee: Alstom Transport SA, Levallois-Perret (FR)

( * ) Notice: Subject to any disclaimer, the term of this patent is extended or adjusted under 35 U.S.C. 154(b) by 310 days.

(21) Appl. No.: 12/231,551

(22) Filed: Sep. 4, 2008

(65) Prior Publication Data

US 2009/0224705 A1   Sep. 10, 2009

(30) Foreign Application Priority Data

Sep. 4, 2007   (FR) ...................................... 07 57338

(51) Int. Cl.
*H02P 3/22*   (2006.01)
(52) U.S. Cl. ........ 318/380; 318/701; 318/438; 318/244; 318/245; 318/246
(58) Field of Classification Search .................. 318/380, 318/438, 244–252, 701
See application file for complete search history.

(56) References Cited

U.S. PATENT DOCUMENTS

| | | | | |
|---|---|---|---|---|
| 4,904,918 A | * | 2/1990 | Bailey et al. | 318/762 |
| 5,170,105 A | * | 12/1992 | Kumar | 318/362 |
| 5,208,741 A | * | 5/1993 | Kumar | 363/124 |
| 5,283,507 A | * | 2/1994 | Stitt et al. | 318/376 |
| 5,962,931 A | * | 10/1999 | Maron et al. | 307/125 |
| 6,445,879 B1 | | 9/2002 | Youn et al. | |
| 6,938,555 B2 | | 9/2005 | Jöckel | |

FOREIGN PATENT DOCUMENTS

| | | |
|---|---|---|
| DE | 101 60 612 | 6/2003 |
| JP | 01133583 | 5/1989 |
| WO | WO 03/049256 A2 | 6/2003 |

* cited by examiner

*Primary Examiner* — Bentsu Ro
*Assistant Examiner* — David S Luo
(74) *Attorney, Agent, or Firm* — Davidson, Davidson & Kappel, LLC

(57) ABSTRACT

This device is an electric safety brake which is intended for an electric traction vehicle, in particular a rail vehicle comprising: a rotating electromechanical machine (10) having permanent magnets having at least one coil with electric terminals (13, 14, 15), a resistive braking torque production device (22), an electromechanical commutator (20) which is capable of reliably connecting the electric terminals (13, 14, 15) of the machine (10) to the braking torque production device (22). It is characterized in that the braking torque production device (22) comprises, on the one hand, a bipolar assembly (122) of at least one dissipative resistor, the assembly having two single connection terminals and forming a common terminal bipolar electric output load for all the terminals (13, 14, 15) of the mechanism and, on the other hand, means (120) for converting the currents from all the terminals (13, 14, 15) into a single current which is supplied to the two single terminals of the assembly of at least one dissipative resistor, the conversion means (120) having no active power switches.

12 Claims, 4 Drawing Sheets

RHEOSTATIC SAFETY BRAKING DEVICE HAVING A BIPOLAR RESISTIVE ASSEMBLY WITH PERMANENT MAGNET MOTOR

This claims the benefit of FR 07 57338 filed on Sep. 4, 2008 and hereby incorporated by reference herein.

The invention relates to an electric safety braking device which is intended for a vehicle which is electrically driven, for example, a rail vehicle.

A safety braking system ensures the desired braking force is produced in an extremely reliable manner.

BACKGROUND OF THE INVENTION

In the field of rail transport, there are principally two types of braking operation: service braking and emergency braking.

The service braking operation is the one which is most commonly used during operation. It can be adjusted between a minimum force value close to 0 and a maximum force value. It can be broken down itself into a plurality of modes, depending on the trains: purely electric brake, purely mechanical brake or combined electric and mechanical brake. It carries out all the "normal" stopping and deceleration operations of the train, and the braking operations for holding on declines. However, it is not secure in the sense that it involves a large number of electric, electronic, mechanical, pneumatic or hydraulic components which may malfunction and therefore bring about a different braking force from that desired, or even, with the new traction chains having traction/static braking commutation, a traction force.

The emergency braking operation is used, as its name suggests, only in the event of an emergency. This emergency condition may be brought about either by an external emergency situation or by a malfunction of the service brake. The object of this brake is to stop the train as quickly and safely as possible. This brake cannot be adjusted but is reliable, that is to say, its probability of failure must be extremely low. This brake must therefore use the fewest possible number of components. Generally, it is purely mechanical, but this requires the mechanical brake to be sized accordingly which may be found to be prohibitive in terms of cost or mass, in particular in a high-speed train where the levels of braking energy to be dissipated are significant. For this reason, it may be very advantageous to produce an electric safety brake.

A type of electric safety braking system is described in the German patent application published as DE 10160 612 A1. The device which uses this braking system comprises a network of three brake resistors which are connected in the form of stars, which is capable of being coupled, using a commutator of the electromechanical type comprising an assembly of relays, to a three-phase electromechanical motor.

The technical problem may be the spatial requirement of this device, in particular three brake resistors.

SUMMARY OF THE INVENTION

This invention proposes an electric safety brake which is based on the fact that an electric motor with permanent magnets requires nothing to provide flux and therefore provides a resistive torque as soon as it rotates, if it is charged.

To this end, the invention provides an electric safety braking device which is intended for an electric traction vehicle, in particular a rail vehicle comprising a rotating electromechanical machine having permanent magnets with electric terminals, a resistive braking torque production device, an electromechanical commutator which is capable of reliably connecting the electric terminals of the machine to the braking torque production device, characterised in that the resistive braking torque production device comprises, on the one hand, a bipolar assembly of at least one dissipative resistor, the assembly having two single connection terminals and forming a common terminal bipolar electric output load for all the terminals of the machine and, on the other hand, means for converting the currents from all the terminals into a single current which is supplied to the two single terminals of the bipolar assembly, the conversion means having no active power switches.

According to specific embodiments, the braking device may include one or more of the following features:
the conversion means include a diode bridge rectifier which is interposed between the electromechanical commutator and the bipolar assembly of at least one dissipative resistor;
the device comprises a chopper which has at least one chopper brake resistor and at least one chopper resistor is a dissipative resistor of the bipolar assembly;
a single chopper brake resistor is a resistor of the bipolar assembly and the chopper comprises two auxiliary commutating relays which are connected at one side and the other of the chopper brake resistor which forms a resistor of the bipolar assembly, and which are capable of disconnecting or connecting the brake resistor of the chopper from/to the conversion means, respectively;
the bipolar assembly of at least one dissipative resistor comprises a single dissipative resistor;
the bipolar assembly of at least one dissipative resistor comprises only two resistors;
the device comprises a traction inverter and the conversion means are a three-phase bridge rectifier which includes the diodes of the traction inverter;
the bipolar assembly includes a resistor and a contactor which are connected in series, this assembly being connected in parallel on the traction inverter; and
the resistor includes a part or all of the brake resistor of the rheostatic braking chopper.

BRIEF DESCRIPTION OF THE DRAWINGS

The invention will be better understood from a reading of the description of the embodiments which will follow and which are given purely by way of example and with reference to the drawings, in which.

DETAILED DESCRIPTION OF A PREFERRED EMBODIMENT

Figure 1:
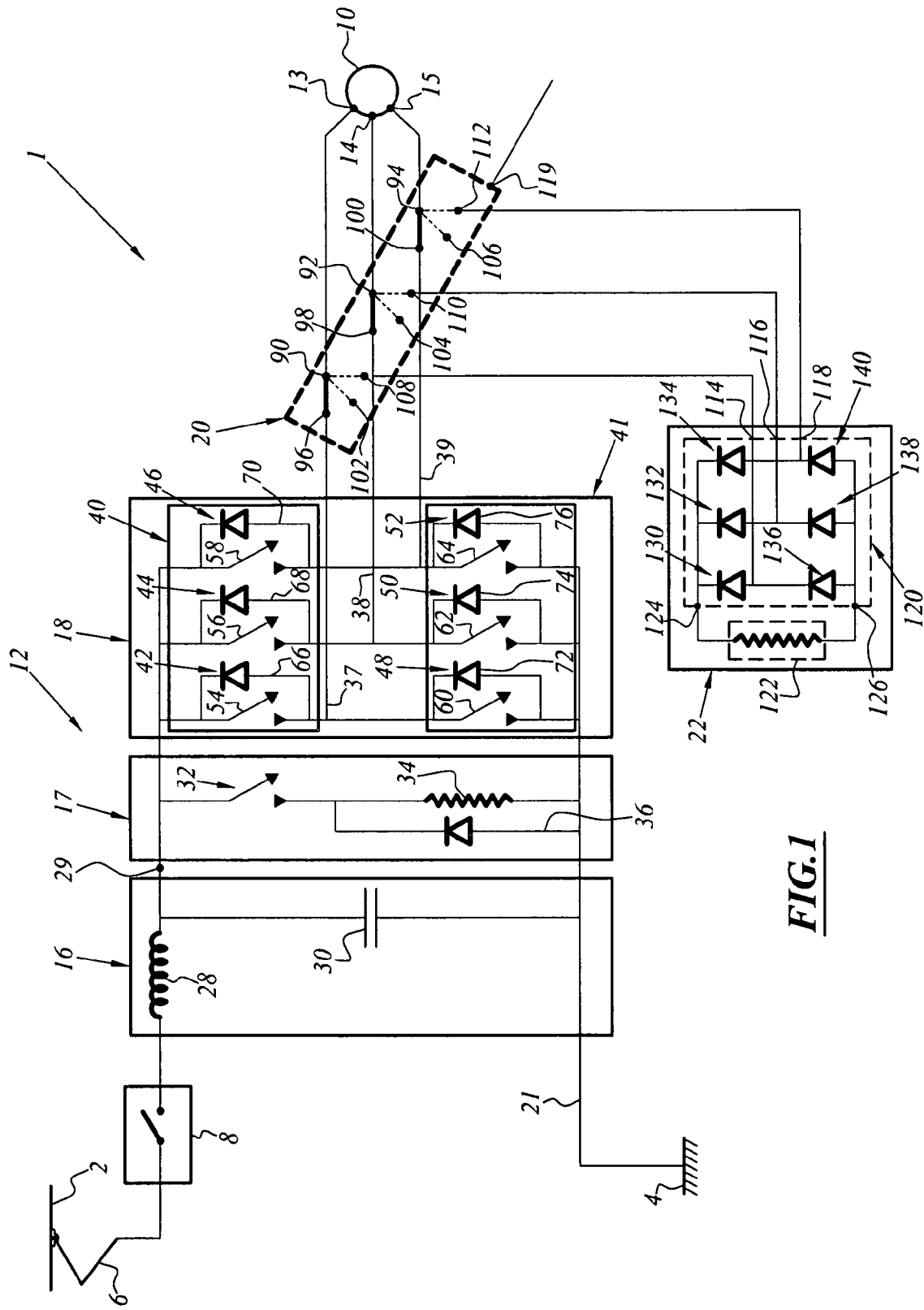
FIG. 1 is a schematic view of a first embodiment of an electric safety brake which is integrated in an electric traction chain.

FIG. 1 illustrates a first embodiment of a so-called electric safety brake integrated in an electric traction chain 1.

The traction chain 1 is supplied with electrical power by means of a catenary line (or a third rail) 2 which is under high voltage and which is referenced by a ground 4 which is connected to the earth.

The electric traction chain 1 comprises a pantograph (or skate) 6 for capturing electrical energy from the catenary line 2 followed by a line circuit-breaker 8 which acts as a main switch/contactor between the traction chain 1 and the catenary line 2.

The electric traction chain 1 also comprises a rotating electromechanical machine 10 which is capable of being supplied with electrical power via an electronic power converter 12.

The rotating electromechanical machine 10 in this instance comprises a stator which has a three-phase power supply and which is provided with electrical input terminals 13, 14, 15 and a rotor whose excitation is provided by a permanent magnet.

In electric traction mode, the electromechanical mechanism 10 operates as a motor while, in electric braking mode, it operates as a voltage generator.

The electronic power converter 12 comprises, in sequence from the circuit-breaker 8 to the motor 10, a line filter 16, a rheostatic braking chopper 17 and an inverter 18, in this instance having a three-phase output, which is capable of supplying the motor 10 with electrical power via an electromechanical connection commutator 20.

All of the elements of the traction chain 1 are connected to the common ground 4 via an earth return line 21.

The electric traction chain 1, in addition to being capable of operating as a traction chain, is also capable of operating as a first, non-safety electric brake, referred to as the service brake.

The first electric brake, referred to as the service brake, comprises components of the traction chain 1, that is to say, the generator 10, the inverter 18 which is configured as a rectifier, the rheostatic braking chopper 17, the line filter 16 and the electromechanical commutator 20.

A second electric brake, referred to as a safety brake, in addition to the rotating electromechanical mechanism 10, comprises the electromechanical commutator 20 and a resistive brake torque production device 22 of the dissipative type.

The line filter 16 comprises in this instance a conventional "LC" structure which is formed by a line inductor 28 which is mounted in series between the circuit-breaker 8 and a line input 29 of the chopper 17 and a capacitor 30 which is electrically connected in parallel close to the input 29 of the chopper 17.

The rheostatic braking chopper 17 comprises a power transistor 32 of the IGBT type (Insulated Gate Bipolar Transistor) which acts, for example, as a regulator and which is connected in series to a rheostatic brake resistor 34.

The rheostatic braking chopper 17 also comprises a free wheel diode 36 which is connected in parallel to the brake resistor 34.

The inverter 18 comprises three alternating three-phase output lines 37, 38, 39 which are each capable of being connected to an electric stator phase input terminal 13, 14, 15, respectively, of the motor 10 via a connection which is produced using the electromechanical commutator 20.

The inverter 18 has a conventional structure having six electronic power switches which are connected in three phases connected between the output of the input filter 16 and the earth return line 21.

Each electronic power switch 42, 44, 46, 48, 50, 52 comprises a power transistor 54, 56, 58, 60, 62, 64, respectively, which is, for example, of the IGBT type and which can be controlled in a conductive state/non-conductive state by a grid voltage, each power transistor being associated with a free wheel diode 66, 68, 70, 72, 74 and 76 which is mounted in an anti-parallel manner thereon.

In this instance, in FIG. 1, the arrow of each power transistor represents the flow direction of the current when this transistor is conductive.

Each power switch 42, 44, 46 is associated with a power switch 48, 50, 52, respectively, the output of one of the first switches being connected to the input of one of the second switches and forming an output of the inverter, each output being connected to an output line 37, 38, 39 of the inverter, respectively.

The control circuits of the electronic power switches are not illustrated in FIG. 1 and are assumed to be capable of providing the electromechanical machine 10 with a synchronous traction function in motor mode.

The electromechanical commutator 20 comprises an assembly of three input pins 90, 92, 94 which are connected to the electric input terminals 13, 14, 15 of the stator phases of the motor 10, respectively.

The electromechanical commutator 20 also comprises a first group of output pins 96, 98, 100 which are connected to the output lines 37, 38, 39 of the inverter 18, respectively.

The electromechanical commutator 20 also comprises a second group of output pins 102, 104 and 106 which are electrically isolated and which are capable of being connected to the input pins 90, 92, 94, respectively, in order to isolate the motor 10 from the inverter 18.

The electromechanical commutator 20 comprises a third group of output pins 108, 110 and 112, each output pin 108, 110 and 112 being connected to an input 114, 116 and 118 of the braking torque production device 22 of the electric safety brake, respectively.

The electromechanical commutator 20 comprises a command input 119 which is capable of receiving a commutation command which allows selective commutation of all of the electrical connections produced by mechanical contact elements, from input pins 90, 92 and 94 to output pins between the first group of output pins, the second group of output pins and the third group of output pins.

Since the electromechanical commutator 20 includes a limited number of passive elements, it may be safe and reliable.

The braking torque production device 22 is formed by a conventional diode bridge 120 which is configured passively as a bridge rectifier, with three inputs 114, 116 and 118 which are capable of receiving an electrical power supply, in this instance a three-phase electrical power supply, and a single terminal bipolar load resistor 122 which is connected between two single outputs 124 and 126 of the diode bridge. The diode bridge is composed in this instance of six diodes 130, 132, 134, 136, 138 and 140.

During operation in traction mode the electromechanical mechanism 10 operates as a motor and the electromechanical commutator 20 is configured in such a manner that the output pins of the first group are connected to the input pins 90, 92, 94. In this manner, the inverter 18 supplies the motor 10 with a sinusoidal current wave which is adapted in a synchronous manner to the speed of the motor.

During a service braking operation, the electromechanical commutator 20 remains in the same state as during the traction operation.

The inverter 18 is configured to operate in rectifier mode and the chopper 17 is controlled to convey to the catenary 6 the portion of braking power which it is able to receive, the remainder of this braking power being dissipated in the resistor 34.

During an electric safety braking operation, the electromechanical commutator 20 is switched successively to the second group, then the third group of output pins in order to isolate the motor 10 from the power converter 12, then to connect each terminal 13, 14, 15 of the rotating machine 10 which acts as a generator to the braking torque production device 22 via the inputs 114, 116 and 118, respectively.

After rectifying the alternating output currents of the generator 10, the diode bridge rectifier 120 provides a continuous supply of electrical energy for the single resistor 122 which dissipates the electrical energy in the form of heat via the Joule effect.

An advantage afforded by the use of one or more resistors 122 at the two single output terminals of a bridge rectifier results in the simplification of the resistive electric circuit diagram and saving in terms of space provided by the reduction of the number of resistors of the same value which are normally arranged between each pair of phases (polygonal arrangement) or in series on each phase (star-like arrangement).

Since the space occupied by the diode bridge rectifier is small compared with that associated with a resistor, and the structure formed by the first embodiment can also be used for any number of motor stator phases by adding diodes to the bridge, using a single load resistor advantageously allows space to be saved.

Figure 2:
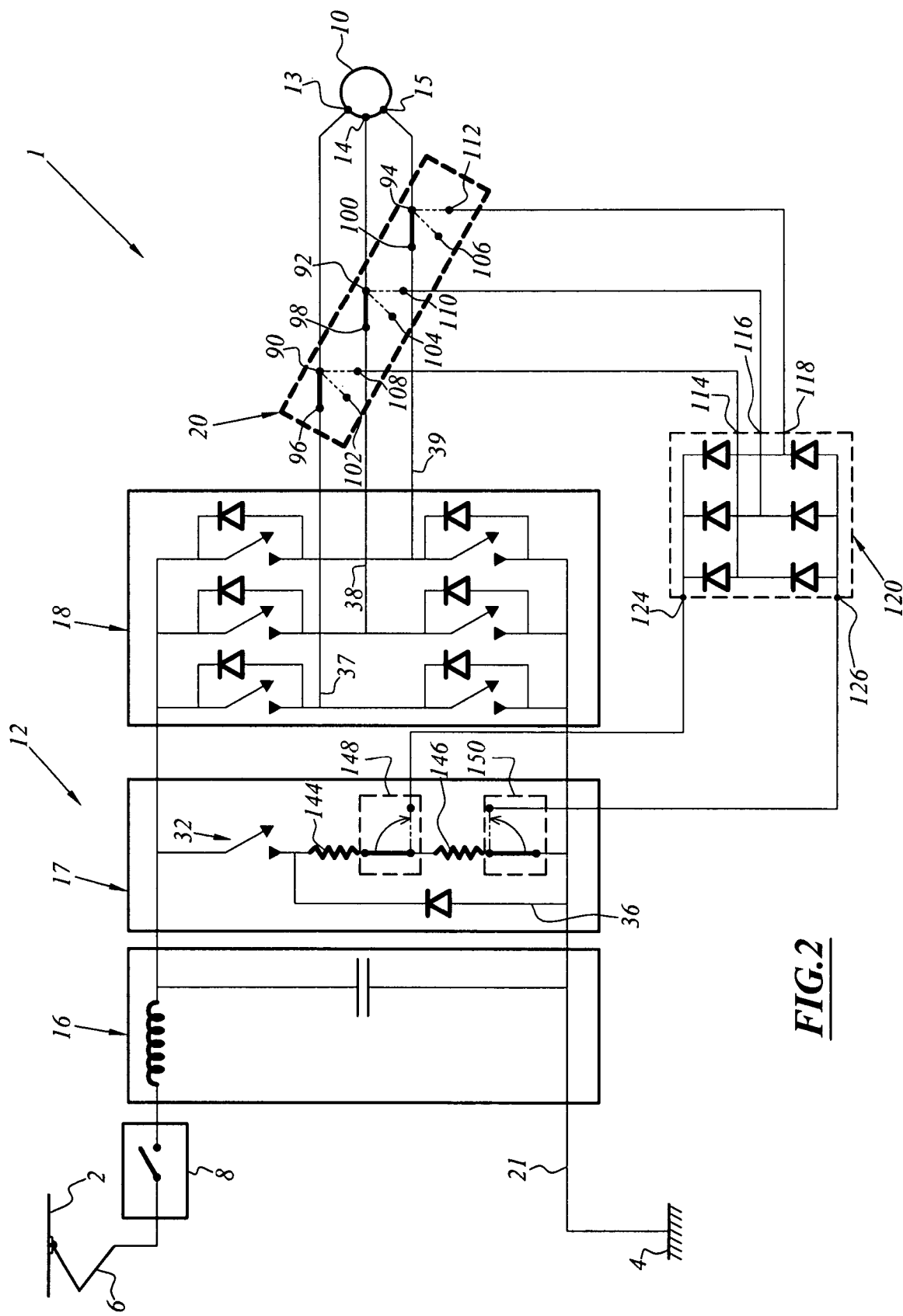
FIG. 2 is a schematic view of a second embodiment of an electric safety brake which is integrated in an electric traction chain.

FIG. 2 illustrates a second embodiment of the electric safety brake which is integrated in the electric traction chain.

The traction chain 1 is similar to that described in FIG. 1 and differs in that the rheostatic brake resistor 34 of the chopper 17 of FIG. 1 is replaced by an assembly of two resistors 144, 146 in series, in that the resistor which is located closest to the earth return line 21, in this instance the resistor 146, acts as a load resistor for the electric safety brake, and that there is arranged at one side and the other of the resistor 146, two electromechanical commutators 148, 150, one of which, 148, allows a terminal of the resistor 146 to be connected, either to the resistor 144 or to the output 124 of the diode bridge 120 of the electric safety brake and the other, 150, allows the other terminal of the resistor 146 to be connected either to the output 126 of the diode bridge 120 of the electric safety brake or to the earth return line 21 of the chopper.

That is to say, the resistor 146 is capable of being connected, owing to the two commutators 148, 150, either to the terminals of the bridge rectifier of the electric safety brake and thus acting as the resistor 122 of FIG. 1 or in series with the resistor 144 in order to form the brake resistor of the chopper 17 (in the same manner as the resistor 34 of FIG. 1).

A specific example of this second embodiment is obtained when the value of the resistor 144 is zero, that is to say, it is absent. In this instance, the resistor 146 acts both as the resistor 34 of the rheostatic chopper of FIG. 1 and the resistor 122 of the braking torque production device 22 of FIG. 1.

The operation in traction mode and in service braking mode is identical to that described for FIG. 1.

During an electric safety braking operation, the commutation sequence of the output pins of the electromechanical commutator 20 is identical to that described for FIG. 1.

In parallel with the commutation of the electromechanical commutator 20, the two commutators 148, 150 disconnect the resistor 146 from the chopper 17 and connect it to the terminals 124, 126 of the bridge rectifier 120.

In this manner, the diode bridge rectifier 120 provides a continuous supply of electrical energy to the single resistor 146 which dissipates the electric braking energy in the form of heat via the Joule effect.

The configuration of FIG. 2 may provide an even greater saving in terms of space on the brake resistors since part, or even all of the resistance of the rheostatic chopper is reused during a safety braking operation.

The relative increase in space resulting from the two electromechanical commutators 148, 150 may be small compared with the additional saving in terms of space obtained by reusing the resistance.

The saving may be greatest when the safety braking uses only the rheostatic chopper resistor, that is to say, when the resistor 144 has a value of zero. No additional resistor is intended to be added for the safety brake.

The degree of reliability of the diagram of FIG. 2 is equivalent to that of FIG. 1 in that only passive electromechanical commutators are used, that is to say, the commutators 20, 148 and 150, and the connection to the chopper 17 is completely isolated.

One variant of this second embodiment involves connecting the resistors 144 and 146 in parallel instead of connecting them in series as in FIG. 2. The commutator 148 allows one of the terminals of the resistor 146 to be connected either to the terminal of the resistor 144 at the switch side 32 or to the output 124 of the diode bridge 120 of the electric safety brake and the commutator 150 allows the other terminal of the resistor 146 to be connected either to the terminal of the resistor 144 at the side of the earth return line 21, or to the output 124 of the diode bridge 120 of the electric safety brake.

Figure 3:
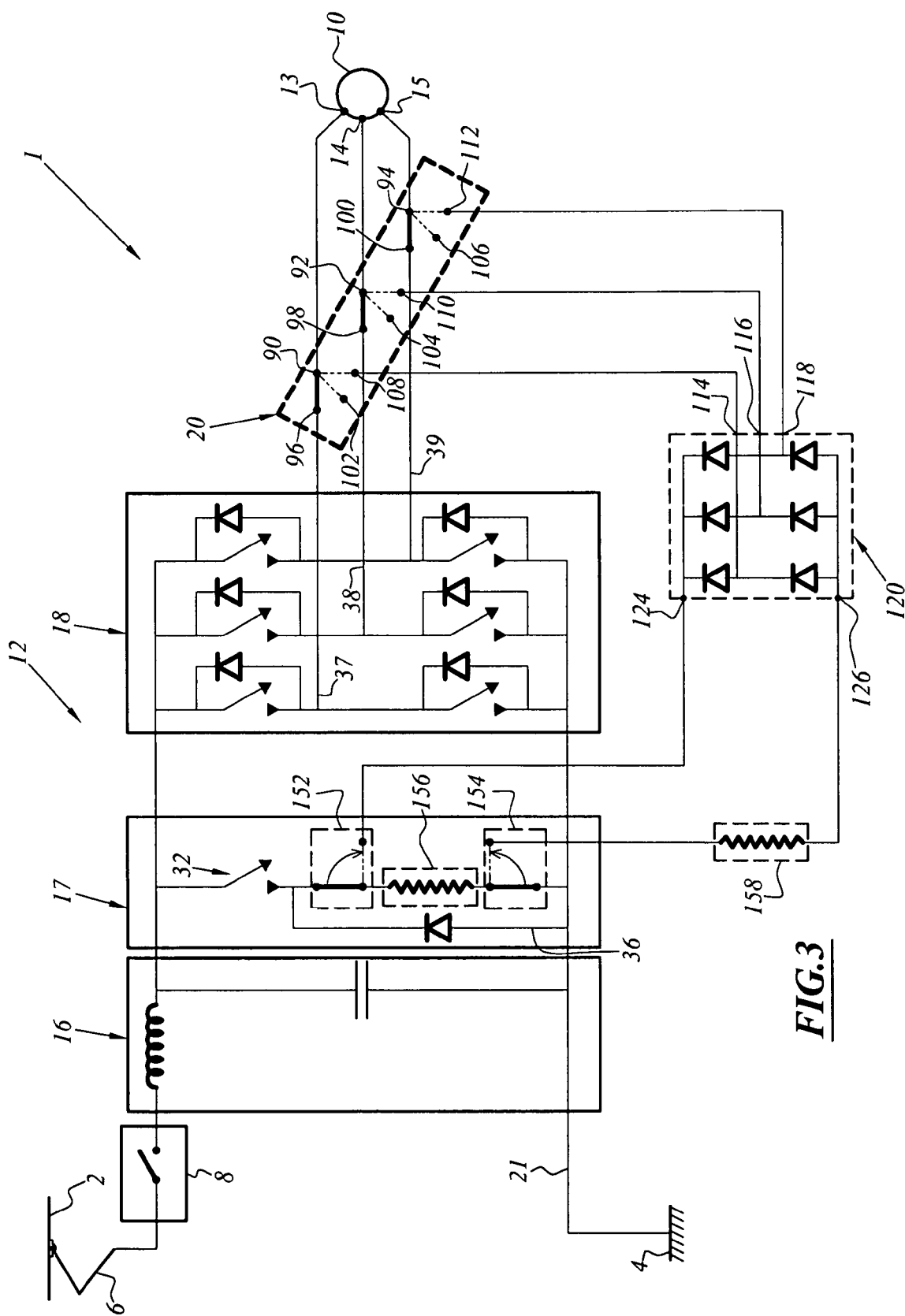
FIG. 3 is a schematic view of a third embodiment of an electric safety brake which is a hybrid of the first and second embodiments.

FIG. 3 illustrates a third embodiment of the electric safety brake which complements the first and second embodiments described in FIGS. 1 and 2.

The traction chain 1 is similar to that of FIG. 1 and differs therefrom in that two auxiliary electromechanical commutators 152 and 154 connected to the terminals of a single rheostatic brake resistor 156 of the chopper 17, respectively, are capable of disconnecting the resistor 156 from the earth return line 21 and connecting it in series to an external resistor 158 which is connected permanently to the diode bridge 120 at the input 126 and at the output of the auxiliary commutator 154.

The load resistor of the braking torque production device 22 of the electric safety brake is composed of the external resistor 158 and the single resistor 156 of the rheostatic brake of the chopper 17.

The operation in traction mode and in service braking mode is identical to that described for FIGS. 1 and 2.

During a safety braking operation, the commutation sequence of the output pins of the electromechanical commutator 20 is identical to that described for FIGS. 1 and 2.

In parallel with the commutation of the electromechanical commutator 20, the two commutators 152, 154 disconnect the resistor 156 from the chopper 17, connect one of the ends thereof to the terminal 124 of the bridge rectifier 120, and the other end to the external resistor 158 which is connected to the terminal 126 of the bridge rectifier.

In this manner, the diode bridge rectifier 120 provides a continuous supply of electrical energy for the series assembly of the two resistors 156, 158 which dissipates the electric braking energy in the form of heat, via the Joule effect.

Although the external resistor 158 is added to the chopper resistor 156, owing to the inadequate value of the latter when a safety braking operation is used at high speed, such a structure allows a greater saving of space compared with the structure of FIG. 1, owing to the reuse of the chopper resistor.

The degree of reliability also may be identical to that of the first and second embodiments.

Figure 4:
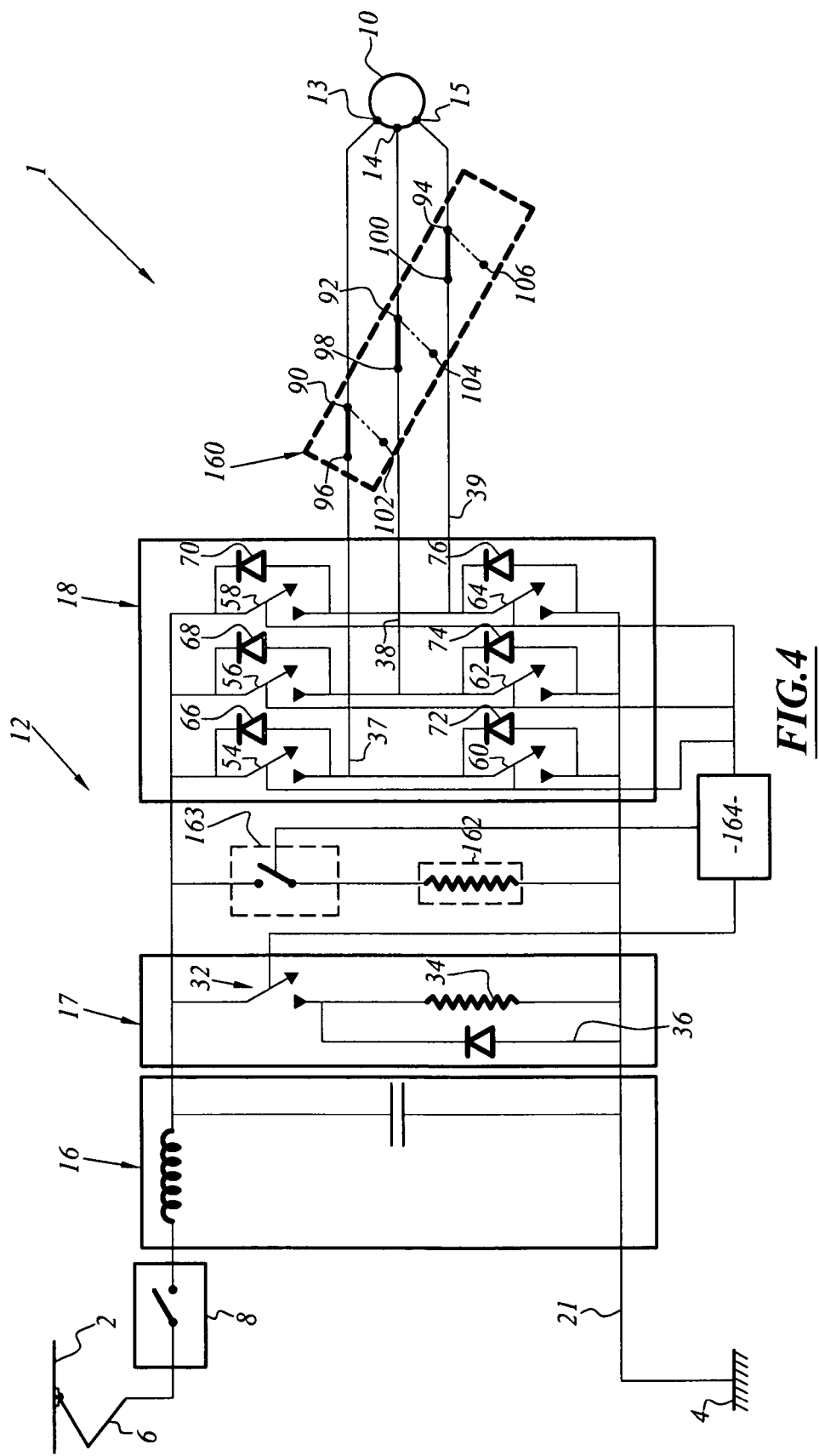
FIG. 4 is a schematic view of a fourth embodiment of an electric safety brake which is integrated in an electric traction chain.

FIG. 4 illustrates a fourth embodiment of an electric safety brake which is integrated in the electric traction chain 1 and which may have a degree of reliability which is slightly less than that of the first, second and third embodiments.

The electric traction chain 1 is similar to that of the three embodiments and differs from that of FIG. 1 in that: the electromechanical commutator 20, having three groups of output pins, is replaced by an electromechanical commutator 160 which comprises only the first and second groups of output pins; the braking torque production device 22 includes in this instance:

the free wheel diode bridge 66, 68, 70, 72, 74, 76 of the inverter 18, a load resistor 162 which is connected in series to an electromechanical contactor 163, the assembly being connected between the chopper 17 and the inverter 18, a blocking circuit 164 which allows the power switches 54, 56, 58, 60, 62, 64 of the inverter 18 and 32 of the chopper 17 to be safely blocked, and the contactor 163 to be closed.

The electromechanical commutator 160 serves to disconnect the motor 10 from the inverter 18, in the event of a short-circuit. This commutator is the one which is conventionally used in this type of traction chain and is not modified by the invention.

The operation in traction mode and in service braking mode is identical to that described for FIGS. 1, 2 and 3.

During an electric safety braking operation, the electromechanical commutator 160 remains in the state in which the electromechanical mechanism 10 is connected to the inverter 18.

The blocking circuits 164 open the six power transistors 54, 56, 58, 60, 62, 64 of the inverter 18 and the power transistor 32 in a controlled manner.

In parallel, the circuits 164 close the auxiliary electromechanical commutator 163 in a controlled manner.

In this manner, the power inverter 18 acts as a simple bridge rectifier which includes the diodes 66, 68, 70, 72 74, 76. The blocking circuits 164 prevent the inverter 18 from acting as an inverter in a secure manner.

In this manner, the free wheel diode bridge 66, 68, 70, 72, 74, 76 acts as the bridge rectifier 120 of FIGS. 1, 2 and 3; it provides the energy of the generator 10 in the load resistor 162 which is connected to the bridge.

The advantage of this solution compared with the three preceding ones is that it requires no additional electronic power components to be added since the bridge rectifier is produced with the existing free wheel diodes of the traction inverter. However, it is slightly less safe than the preceding solutions since the safety braking system cannot be used in the event of a breakdown of the inverter 18 owing to a short-circuit.

With reference to the production variants of FIG. 1 described by FIGS. 2 and 3, it is possible to envisage production variants of FIG. 4 in which the resistor 162 is produced, owing to a set of 2 contactors, by a portion of the resistor 34 (as in FIG. 2) or, instead in which the resistor 162 includes the resistor 34 in series with an additional resistor (as in FIG. 3). A specific example is that this resistor 162 includes only the resistor 34 (as is the case when the resistor 144 of FIG. 2 is zero). In this instance, the safety brake requires only the addition of the contactor 163 and the control circuit 164 compared with the electric circuit diagram with no safety brake and it is therefore very economical in terms of space, weight and cost.

The invention claimed is:

1. An electric safety braking device for an electric traction vehicle comprising:
a rotating electromechanical machine having permanent magnets with electric terminals;
a resistive braking torque production device;
an electromechanical commutator for connecting the electric terminals of the machine to the braking torque production device, the electromechanical commutator for connecting and isolating the electromechanical machine to and from a traction inverter;
the resistive braking torque production device includes a bipolar assembly of at least one dissipative resistor, the assembly having two single connection terminals and forming a common terminal bipolar electric output load for all the terminals of the machine and means for converting currents from all the electric terminals into a single current supplied to the two single terminals of the bipolar assembly, the conversion means having no active power switches.

2. The electric safety braking device as recited in claim 1 wherein the electric traction vehicle is a rail vehicle.

3. The electric safety braking device according to claim 1 wherein the conversion means includes a diode bridge rectifier interposed between the electromechanical commutator and the bipolar assembly of at least one dissipative resistor.

4. The electric safety braking device according to claim 1 further comprising a chopper which has at least one chopper brake resistor and at least one chopper brake resistor is a dissipative resistor of the bipolar assembly.

5. The electric safety braking device according to claim 4 wherein the at least one chopper brake resister includes a single chopper brake resistor that is a resistor of the bipolar assembly, the chopper including two auxiliary commutating relays connected at one side and at another side of the single chopper brake resistor that is a resistor of the bipolar assembly, the two auxiliary commutating relays being capable of disconnecting or connecting the brake resistor of the chopper from/to the conversions device, respectively.

6. The electric safety braking device according to claim 4 wherein a resistor includes a part or all of the brake resistor of the rheostatic braking chopper.

7. The electric safety braking device according to claim 1 wherein the bipolar assembly of at least one dissipative resistor includes a single dissipative resistor.

8. The electric safety braking device according to claim 1 wherein the bipolar assembly of at least one dissipative resistor includes only two resistors.

9. The electric safety braking device according to claim 1 further comprising the traction inverter, the conversion device being a three-phase rectifier bridge which includes diodes of the traction inverter.

10. The electric safety braking device according to claim 9 wherein the bipolar assembly includes a resistor and a contactor connected in series, the assembly being connected in parallel on the traction inverter.

11. The electric safety braking device according to claim 10 wherein the resistor includes a part or all of the brake resistor of a rheostatic braking chopper.

12. An electric safety braking device for an electric traction vehicle comprising:
a rotating electromechanical machine having permanent magnets with electric terminals;
a resistive braking torque production device;
an electromechanical commutator for connecting the electric terminals of the machine to the braking torque production device, the electromechanical commutator for connecting and isolating the electromechanical machine to and from a traction inverter;
the resistive braking torque production device includes a bipolar assembly of at least one dissipative resistor, the assembly having two single connection terminals and forming a common terminal bipolar electric output load for all the terminals of the machine and a converter for converting currents from all the electric terminals into a single current supplied to the two single terminals of the bipolar assembly, the converter having no active power switches.

* * * * *